US011590798B2

(12) United States Patent
Monteleone et al.

(10) Patent No.: US 11,590,798 B2
(45) Date of Patent: Feb. 28, 2023

(54) RETRACTABLE GUARD ASSEMBLIES

(71) Applicant: Alcon Inc., Fribourg (CH)

(72) Inventors: William Monteleone, Aliso Viejo, CA (US); Marc Nestor, Aliso Viejo, CA (US); Brandon L. Spoelstra, Trabuco Canyon, CA (US)

(73) Assignee: Alcon Inc., Fribourg (CH)

( * ) Notice: Subject to any disclaimer, the term of this patent is extended or adjusted under 35 U.S.C. 154(b) by 0 days.

(21) Appl. No.: 17/402,981

(22) Filed: Aug. 16, 2021

(65) Prior Publication Data

US 2022/0063330 A1 Mar. 3, 2022

Related U.S. Application Data

(60) Provisional application No. 63/072,280, filed on Aug. 31, 2020.

(51) Int. Cl.
*B60B 33/00* (2006.01)

(52) U.S. Cl.
CPC .......... *B60B 33/00* (2013.01); *B60B 2200/26* (2013.01); *B60B 2900/531* (2013.01)

(58) Field of Classification Search
CPC ... Y10T 16/207; Y10T 16/216; Y10T 16/184; B60B 33/0015; B60B 33/00; B60B 33/0002; B60B 33/006; B60B 7/00; B60B 7/06; B60B 7/061; B60B 2900/212; B60B 2900/531; B60B 2900/551; B60B 2200/26; B60B 2200/41; B60B 2200/43;
(Continued)

(56) References Cited

U.S. PATENT DOCUMENTS 1,687,631 A * 10/1928 Oberwegner ......... B60B 33/021
                                                        16/34
2,033,207 A * 3/1936 Schultz, Jr. ......... B60B 33/0078
                                                        16/32
(Continued)

FOREIGN PATENT DOCUMENTS

CN       209454465 U  * 10/2019
DE         2839344 A1    3/1980
(Continued)

OTHER PUBLICATIONS

Spoesitra, Brandon L., "Retractable Guard Assemblies," U.S. Appl. No. 17/805,580, filed Jun. 6, 2022 in the United States Patent and Trademark Office, 30 pgs.

*Primary Examiner* — Chuck Y Mah
(74) *Attorney, Agent, or Firm* — Patterson + Sheridan, LLP (57) ABSTRACT

Particular embodiments disclosed herein provide a retractable guard assembly coupled to a caster of a mobile equipment, comprising one or more first guards comprising corresponding one or more guard toeholds and one or more second guards. When the one or more first guards and the one or more second guards are in a fully retracted state, fully compressing any one of the one or more guard toeholds causes the one or more first guards and the one or more second guards to transition into a fully deployed state. When the one or more first guards and the one or more second guards are in a fully deployed state, fully lifting any one of the one or more guard toeholds causes the one or more first guards and one or more second guards to transition into the fully retracted state.

15 Claims, 5 Drawing Sheets

(58) Field of Classification Search
CPC ... B60B 2200/432; A47B 91/00; A47B 91/12; A47B 95/043; A47B 2095/046; A47C 19/024
See application file for complete search history.

(56) References Cited

U.S. PATENT DOCUMENTS

| | | | | |
|---|---|---|---|---|
| 2,923,017 | A | * | 2/1960 | Turbyfill ............ B60B 33/00 15/52.1 |
| 2,996,752 | A | * | 8/1961 | Pope ............ B60B 33/0002 293/58 |
| 3,441,974 | A | * | 5/1969 | Hollie ............ A47B 91/028 16/33 |
| 4,025,099 | A | * | 5/1977 | Virden ............ B60B 33/00 293/58 |
| 4,800,617 | A | * | 1/1989 | Yeh ............ B60B 33/0089 16/18 CG |
| 5,001,808 | A | * | 3/1991 | Chung ............ B60B 33/06 16/33 |
| 5,371,920 | A | * | 12/1994 | Rainville ............ B60B 33/0028 128/203.12 |
| 5,873,144 | A | | 2/1999 | Tupper et al. |
| 5,983,452 | A | * | 11/1999 | McGovern ............ B60B 33/00 16/18 B |
| 6,626,445 | B2 | | 9/2003 | Murphy |
| 8,684,145 | B2 | | 4/2014 | Boukhny |
| 8,910,344 | B2 | | 12/2014 | Nguyen et al. |
| 9,108,462 | B1 | * | 8/2015 | Stone ............ B60B 33/0023 |
| 9,944,120 | B1 | * | 4/2018 | Butler ............ B60B 33/0063 |
| 2008/0230670 | A1 | * | 9/2008 | Healy ............ A47B 91/06 248/346.11 |
| 2017/0190212 | A1 | | 7/2017 | Horch |
| 2017/0267217 | A1 | * | 9/2017 | Yoon ............ B60S 1/68 |
| 2018/0281718 | A1 | * | 10/2018 | Barker ............ B60B 33/00 |
| 2019/0381828 | A1 | * | 12/2019 | Hession ............ B60B 33/0015 |

FOREIGN PATENT DOCUMENTS

| | | | |
|---|---|---|---|
| DE | 102006049071 B3 | 11/2007 | |
| JP | 2019081525 A | 5/2019 | |
| WO | WO-2018165370 A1 * | 9/2018 | ............ A46B 3/00 |

\* cited by examiner

FIG. 1

FIG. 2A (Guards Deployed)
FIG. 2B (Guards Retracted)
FIG. 2C

FIG. 3

(Guards Deployed)

FIG. 4A

(Guards Retracted)

RETRACTABLE GUARD ASSEMBLIES

PRIORITY CLAIM

This application claims the benefit of priority of U.S. Provisional Patent Application Ser. No. 63/072,280 titled "RETRACTABLE GUARD ASSEMBLIES," filed on Aug. 31, 2020, whose inventors are William Monteleone, Marc Nestor and Brandon L. Spoelstra, which is hereby incorporated by reference in its entirety as though fully and completely set forth herein.

BACKGROUND

Field

The present disclosure relates generally to retractable guard assemblies for use in connection with casters of mobile equipment, such as medical or non-medical equipment.

Description of the Related Art

Many types of equipment, particularly medical equipment, have rotating caster wheels such that they can be mobile and moved around. For example, this mobility allows medical staff to move medical equipment around in operating rooms, from one operating room to another, from one floor to another (e.g., using elevators), etc. However, in certain cases, an equipment (e.g., medical equipment) rolling on caster wheels may bind when the equipment is rolled onto electrical cables, fluid hoses, and other similar objects. This is a nuisance to the equipment operator and reduces the equipment's mobility. Further, it can cause the equipment to tip over, damage the electrical cables, pinch hoses shut, and pose other similar issues.

In certain cases, certain existing cable guards are used in conjunction with casters for purposes of pushing cables and hoses asides, such as to prevent the equipment from rolling onto the cables and hoses and causing the issues discussed above. However, the existing cable guards pose certain additional and undesired issues. For example, some of the existing cable guards have to be removed and stored when the equipment is moved over fixed obstacles such as doorsills and elevator sills or non-fixed but difficult-to-move obstacles such as floor mats. Forcing an equipment operator to remove and store cable guards every time the equipment has to be moved over such objects, however, is extremely burdensome for the operator.

Some of the other existing cable guards are in a fixed position and, therefore, cannot even be removed when the equipment is about to move over fixed obstacles. As such, the fixed cable guards bind on such obstacles and can cause the equipment to tip over.

BRIEF SUMMARY

The present disclosure relates generally to retractable guard assemblies for use in connection with casters of mobile equipment, such as medical or non-medical equipment.

Particular embodiments disclosed herein provide a retractable guard assembly coupled to a caster of a mobile equipment, comprising one or more first guards comprising corresponding one or more guard toeholds and one or more second guards. When the one or more first guards and the one or more second guards are in a fully retracted state, fully compressing any one of the one or more guard toeholds causes the one or more first guards and the one or more second guards to transition into a fully deployed state. In a fully deployed state, each of the one or more first guards and the one or more second guards has a first clearance with the ground. When the one or more first guards and the one or more second guards are in a fully deployed state, fully lifting any one of the one or more guard toeholds causes the one or more first guards and one or more second guards to transition into the fully retracted state. In a fully retracted state, each of the one or more first guards and one or more second guards has a second clearance with the ground, and the second clearance is larger than the first clearance.

Particular embodiments disclosed herein provide a caster assembly of a mobile equipment, comprising a caster comprising a caster wheel and a retractable guard assembly coupled to the caster. The retractable guard assembly comprises one or more first guards, comprising corresponding one or more guard toeholds, and one or more second guards. When the one or more first guards and the one or more second guards are in a fully retracted state, fully compressing any one of the one or more guard toeholds causes the one or more first guards and the one or more second guards to transition into a fully deployed state. In a fully deployed state, each of the one or more first guards and the one or more second guards has a first clearance with the ground. When the one or more first guards and the one or more second guards are in a fully deployed state, fully lifting any one of the one or more guard toeholds causes the one or more first guards and one or more second guards to transition into the fully retracted state. In a fully retracted state, each of the one or more first guards and one or more second guards has a second clearance with the ground, and the second clearance is larger than the first clearance.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Particular embodiments of the present disclosure provide retractable guard assemblies that may be used in connection with casters of mobile equipment. While the embodiments below describe retractable guard assemblies that are mounted on casters and used in connection with a medical equipment, such as an ophthalmic surgical console, those of ordinary skill in the art appreciate that the retractable guard assemblies described herein may be used in conjunction with a variety of medical and non-medical equipment. Examples of such medical equipment include surgical and non-surgical consoles, diagnostic equipment, hospital beds, hospital cards, stretchers, IV poles (intravenous poles) and other mobile medical equipment. Examples of non-medical equipment include any mobile electrical and/or mechanical devices and accessories with casters.

Figure 1:
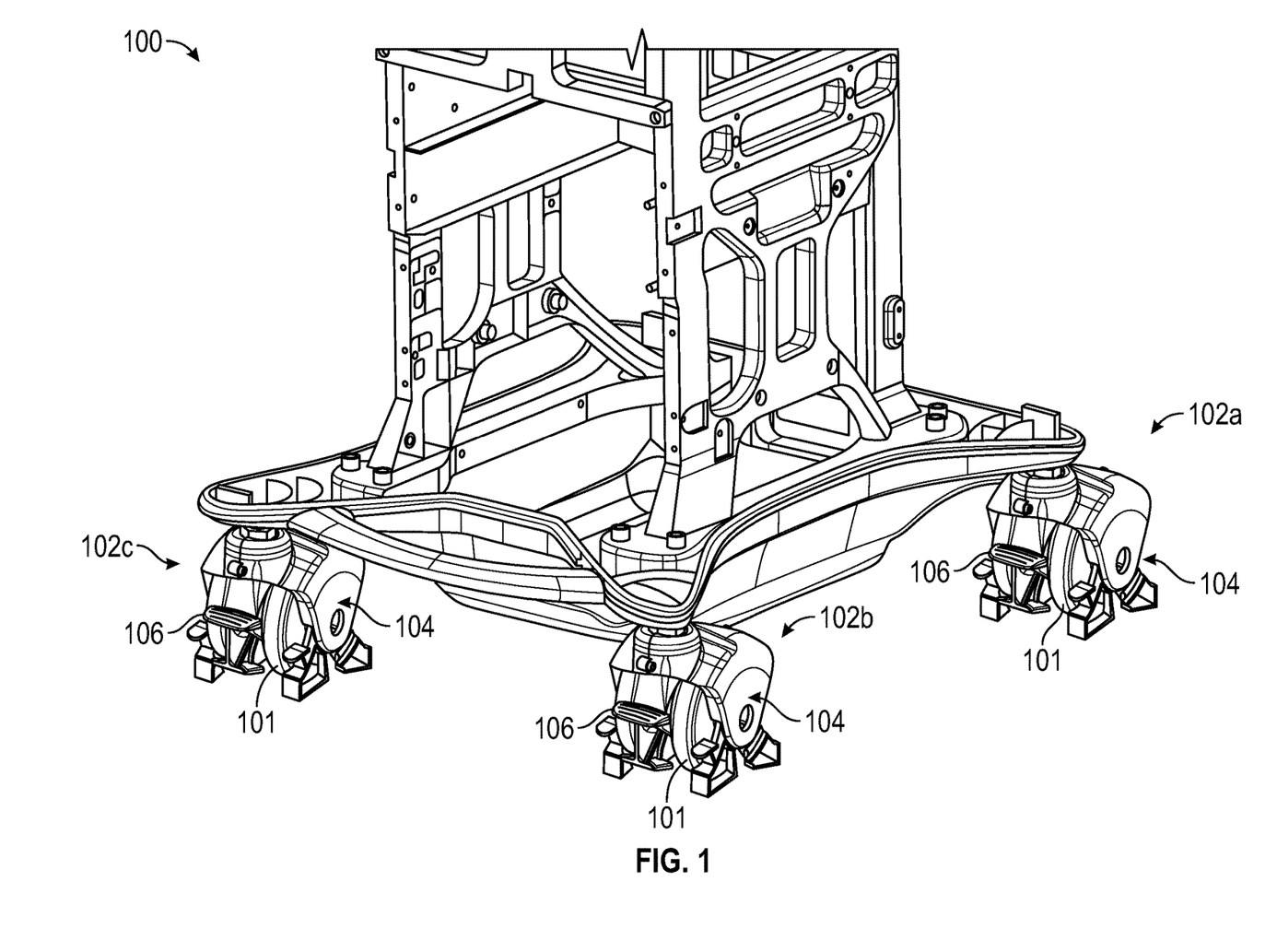
FIG. 1 illustrates a medical equipment including four caster assemblies, in accordance with certain embodiments of the present disclosure.

FIG. 1 illustrates a medical equipment 100 including four casters assemblies 102a, 102b, 102c, and 102d (now shown). As shown, each caster assembly 102 includes a caster (e.g., caster 303, shown in FIG. 3) with a rotating caster wheel ("caster wheel") 101 and a caster lock toehold 106. Pressing caster lock toehold 106 causes it to make contact with the ground and, therefore, create friction that may prevent a corresponding caster wheel 101 from rotating.

Each caster assembly 102 also includes a retractable guard assembly 104, as described in more detail below. In certain embodiments, each retractable guard assembly 104 is mounted on a corresponding caster during the manufacturing process. As further described in relation to FIG. 2, each retractable guard assembly 104 comprises cable pusher toeholds (or guard toeholds) that, when pressed down, are configured to deploy four guards. When deployed, the guards are configured to push objects such as cables, hoses, and other similar objects aside. In the deployed state, the guards provide a certain amount of clearance with the ground in order to allow medical equipment 100 to be moved around. The clearance (e.g., distance between the bottom of the guards and the ground), however, is configured such that the guards are still able to make contact with cables, hoses, and other similar objects and push them aside. When the toeholds are lifted, the corresponding guards are retracted, thereby creating a larger clearance with the ground, such that medical equipment 100 can be easily moved over fixed objects (e.g., obstacles), such as doorsills and elevator sills, or non-fixed but difficult-to-move obstacles such as floor mats.

Figure 2A:
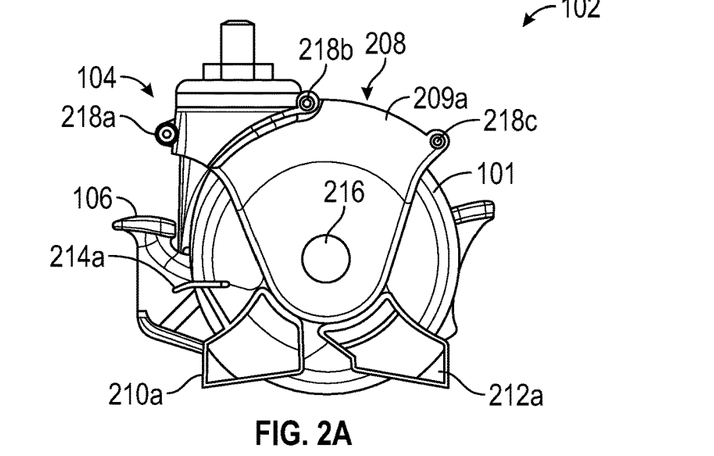
FIG. 2A illustrates a side view of a caster assembly of FIG. 1 including a retractable guard assembly in a deployed state, in accordance with certain embodiments of the present disclosure.
Figure 2B:
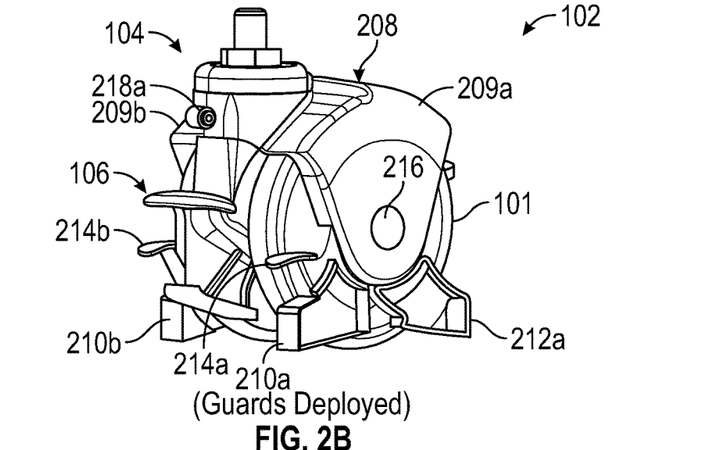
FIG. 2B illustrates a perspective view of the caster assembly of FIG. 2A, in accordance with certain embodiments of the present disclosure.
Figure 2C:
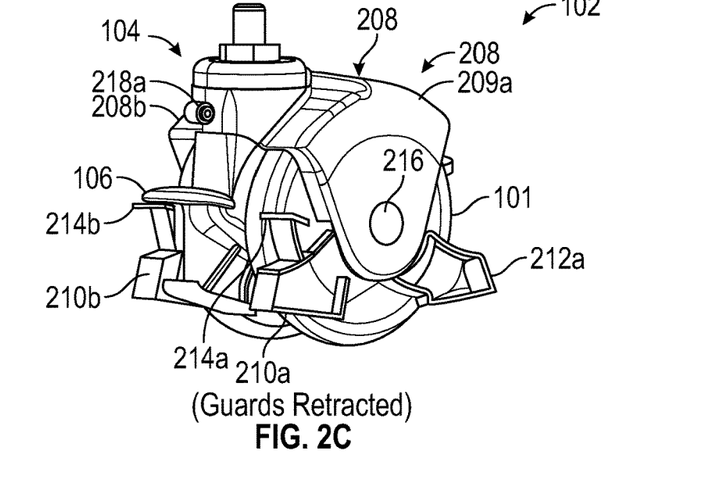
FIG. 2C illustrates a perspective view of the caster assembly of FIG. 2B including the retractable guard assembly in a retracted state, in accordance with certain embodiments of the present disclosure.

FIG. 2A illustrates a side view of a caster assembly 102 including a retractable guard assembly 104 in a deployed state, according to some embodiments. FIG. 2B illustrates a perspective view of caster assembly 102 including retractable guard assembly 104 in a deployed state, according to some embodiments. FIG. 2C illustrates a perspective view of caster assembly 102 including retractable guard assembly 104 in a retracted state, according to some embodiments. Caster assembly 102, shown in FIGS. 2A-2C may be any one of caster assemblies 102a, 102b, 102c, or 102d of FIG. 1. FIGS. 2A-2C are described together herein for clarity.

Retractable guard assembly 104 is mounted on a caster (shown as caster 303 in FIG. 3) including a caster wheel 101 and a caster lock toehold 106, among other components. Retractable guard assembly 104 comprises a housing 208, front guards 210, rear guards 212, snap buttons 216, screws 218, as well as other components shown in more detail in FIG. 3. Housing 208 comprises two housing pieces 209a and 209b. In FIG. 2A only housing piece 209a is shown but housing piece 209b is partly shown in FIGS. 2B and 2C. Housing pieces 209a and 209b are coupled together using screws 218a-218c and caps (shown in FIG. 3). As shown, front guards 210a and 210b are positioned symmetrically such that there is a front guard on each side of caster wheel 101. Front guards 210a and 210b are linked together using a bridge link (shown in FIGS. 3 and 5), such that moving one of the front guards (e.g., front guard 210a) also moves the other front guard (e.g., 210b). Each front guard 210 includes a cable pusher toehold 214 (also referred to as "guard toehold"). For example, front guard 210a includes cable pusher toehold 214a and front guard 210b includes cable pusher toehold 214b. Rear guards 212a and 212b are also positioned symmetrically such that there is a read guard on each side of caster wheel 101. A snap button 216 is used to movably and/or detachably couple front guards 210, rear guards 212, and housing pieces 209a-209b together.

As described above, in a deployed state, front guards 210 and rear guards 212 provide a minimal amount of clearance with the ground to allow medical equipment 100 to be moved around while also pushing any objects such as cables, out of the way. In order to retract front guards 210 and rear guards 212, a user may, for example, use their toes to lift one of cable pusher toeholds 214a-214b, which then retracts all four of front guards 210 and rear guards 212. Note that because front guards 210a and 210b are linked, lifting or retracting any one of the four guards causes a retraction in the other. As such, lifting either one of cable pusher toeholds 214a-214b lifts both front guards 210, which in turn causes a retraction in the rear guards 212. In certain embodiments, a retraction of front guards 210 causes a retraction of rear guards 212 because of a component referred to as a slide (shown in FIGS. 3 and 4a-4B) that acts as an interface between each pair of front and rear guards (e.g., front guard 210a and read guard 212a being the first pair and front guard 210b and read guard 212b being the second pair). For example, lifting cable pusher toehold 214a causes front guard 210a to rotate around an axis along snap button 216 in a clockwise manner. This clockwise movement of front guard 210a moves the slide which then interfaces with rear guard 212a to cause a counter-clockwise movement in rear guard 212a, thereby also retracting rear guard 212a.

Note that although in the embodiments described herein only front guards 210 include cable pusher toeholds 214, in certain embodiments, each of the rear guards 212 may also include a cable pusher toehold 214. In certain other embodiments, only read rear guards 212 include cable pusher toeholds 214. In yet certain other embodiments, only front guard 210a and rear guard 212a (or alternatively only front guard 210b and rear guard 212b) may include cable pusher toeholds. In certain embodiments, rear guards 212 may also or instead be linked with a bridge link.

Figure 3:
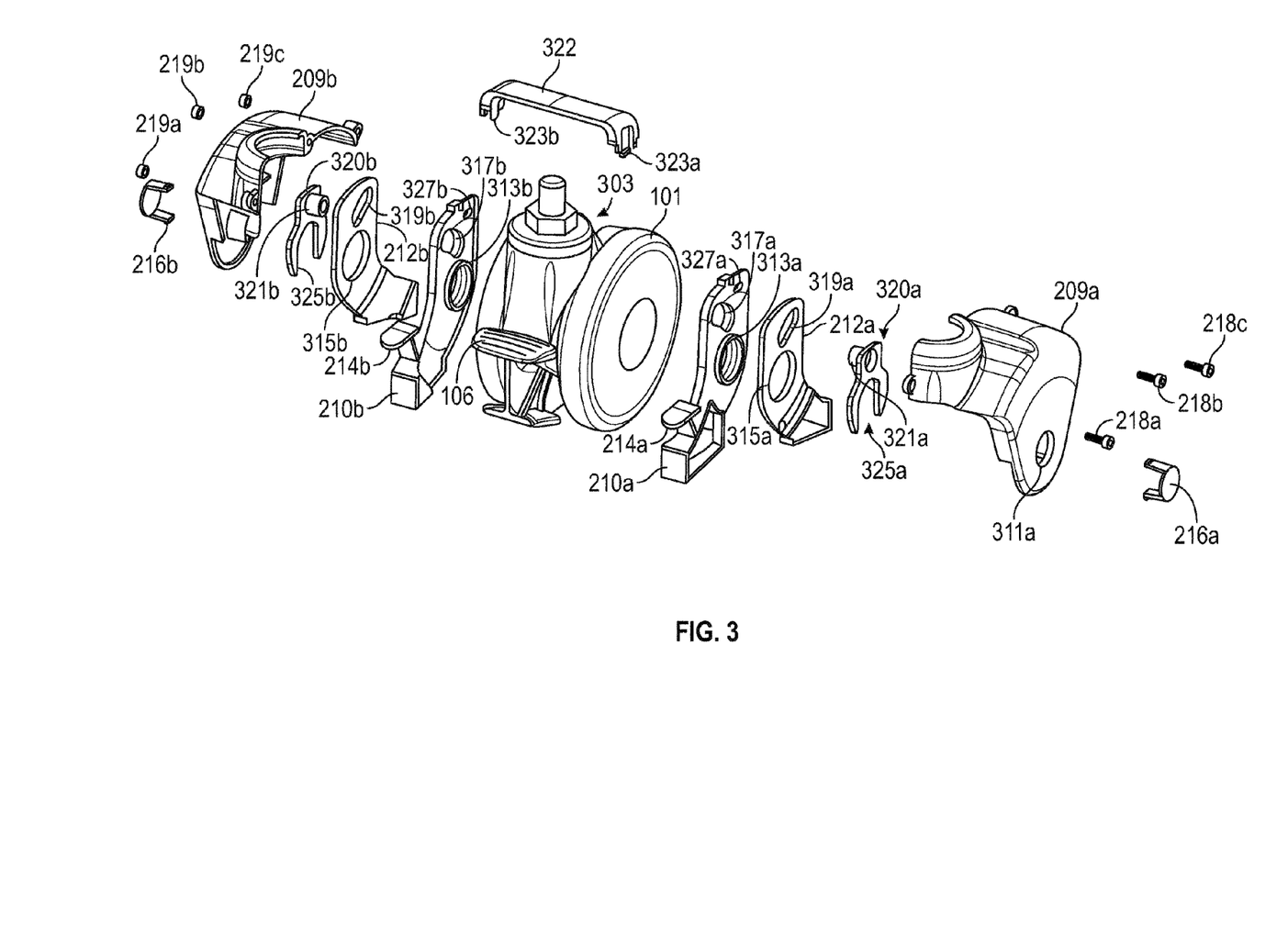
FIG. 3 illustrates an exploded view of the caster assembly of FIGS. 2A-2C, in accordance with certain embodiments of the present disclosure.

FIG. 3 illustrates an exploded view of the caster assembly 102 of FIGS. 2A-2C, according to certain embodiments. As shown, a snap button 216a is configured to be inserted and snapped into opening 311a of housing piece 209a, u-shaped opening 325a of slide 320a, opening 315a of rear guard 212a, and an opening 313a of front guard 210a, in the order shown. When snap button 216a snaps into all such openings, it holds housing piece 209a, slide 320a, rear guard 212a, and front guard 210a together such that rear guard 212a and front guard 210a may rotate around an axis along snap button 216 (e.g., an axis that passes through all the openings and is perpendicular to the outer surface of caster wheel 101) and relative to housing piece 209a. Snap button 216b functions similar to snap button 216a. Snap button 216b is configured to be inserted and snapped into the opening of housing piece 209b, u-shaped opening 325b of slide 320b, an opening 315b of rear guard 212b, and opening 313b of front guard 210b, in the order shown. When snap button 216b snaps into all such openings, it holds housing piece 209b, slide 320b, rear guard 212b, and front guard 210b together such that rear guard 212b and front guard 210b may rotate around an axis along snap button 216b and relative to housing piece 209b.

The components that are held together using snap button 216a and the components that are held together using snap button 216b are configured to be coupled together, thereby producing retractable guard assembly 104, by screwing housing piece 209a to housing piece 209b using screws 218a-218c and corresponding screw caps 219a-219c. As described above, a bridge link 322 is used to link front guards 210a and 210b together. As shown, bridge link 322 comprises detents 323a and 323b that are configured to be slightly compressed inwardly (e.g., towards caster wheel 101) and inserted into openings 327a and 327b, respectively, of corresponding front guard 210a and front guard 210b. More specifically, in embodiments of FIG. 3, openings 327a and 327b are configured to receive the tips of detents 323a and 323b to hold bridge link 322 in between front guard 210a and front guard 210b.

FIG. 3 also shows slides 320a and 320b. As shown, slide 320a has a cylindrical extension 321a that is configured to pass through a slot 319a of rear guard 212a and a slot 317a of front guard 210a (e.g., slide 320a is detachably coupled to rear guard 212a and front guard 210a). As described above and also in relation to FIGS. 4A and 4B, slide 320a acts an interface between front guard 210a and rear guard 212a, such as by transferring rotational movement of front guard 210a to rear guard 212a, thereby causing rear guard 212a to rotate in the opposite direction. Slide 320b functions in a similar manner as slide 320a.

Figure 4A:
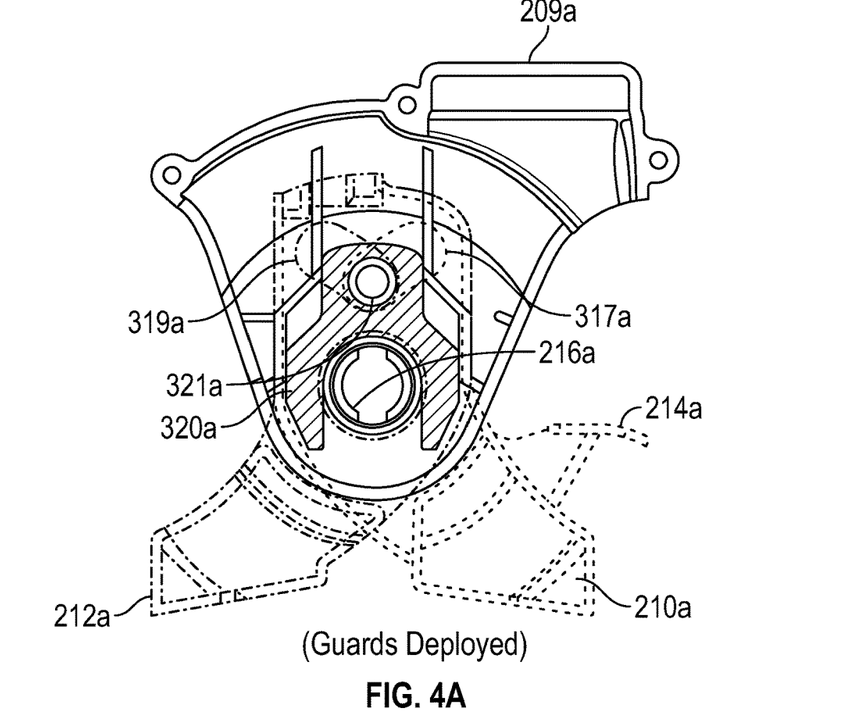
FIG. 4A illustrates an internal side view of a front guard and a rear guard in a deployed state, in accordance with certain embodiments of the present disclosure.

FIG. 4A illustrates a internal side view of front guard 210, rear guard 212a, slide 320a, and housing piece 209a, which are all held together using snap button 216a. In FIG. 4A, front guard 210a and rear guard 212a are in a fully deployed state. In the fully deployed state, the cylindrical extension 321a of slide 320a is positioned at the inner end of each of slots 317a and 319a. The inner ends of slots 317a and 319a refer to the ends that are closer to the ground or the center of snap button 216a. The outer ends of slots 317a and 319a refer to the ends that are farthest from the ground or the center of snap button 216a. As shown, slot 317a is sized and shaped such that when cable pusher toehold 214 is lifted up, slide 320a is pushed towards not only the outer end of slot 317 but also the outer end of slot 319a. For example, slot 317 is curved and/or shaped like a bean. The curvature of slot 317a exerts force (e.g., upwards force or force that pushes extension 321a away from snap button 216a) on extension 321a when front guard 210a rotates relative to snap button 216a. Because extension 321a can only move within slots 317a and 319a, any force, such as upwards force exerted by front guard 210a on extension 321 causes extension 321a to travel from the inner ends of slots 317a and 319a to the outer ends thereof.

Figure 4B:
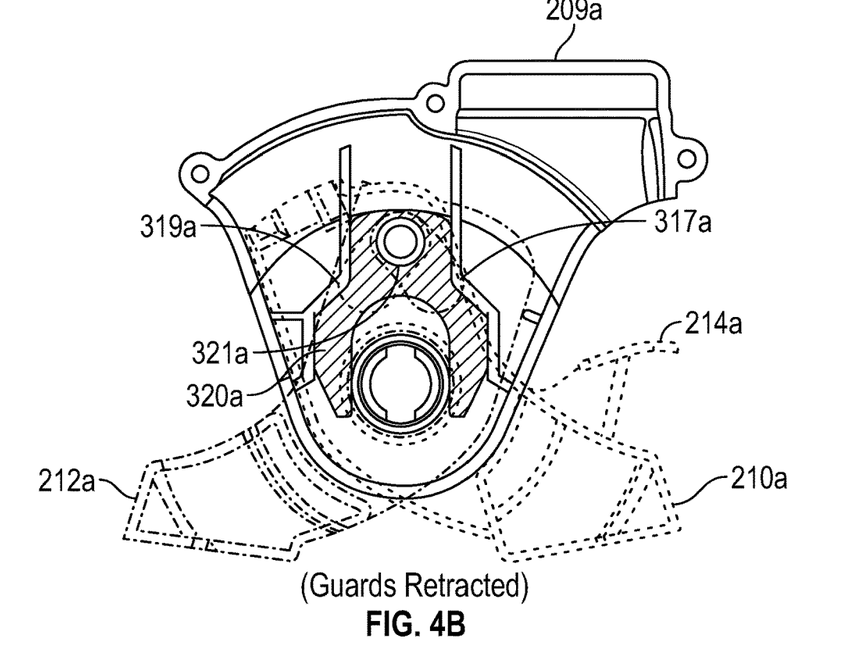
FIG. 4B illustrates an internal side view of the front guard and the rear guard of FIG. 4A in a retracted state, in accordance with certain embodiments of the present disclosure.

FIG. 4B illustrates extension 321a being positioned at the outer ends of slots 317a and 319a, which means that that, relative to where extension 321a was positioned in FIG. 4A, extension 321a and, therefore, slide 320a has moved away from snap button 216a. In FIG. 4B, as shown, front guard 210a and rear guard 212a are in a fully retracted state.

In certain embodiments, grooves or detents (e.g., detents 331a-331b) are provided in the axis openings of the inner extensions (inner extensions 330) of front guards 210a-210b. Such detents are configured to interface with bumps or protrusions on arms of corresponding snap buttons 216. In such embodiments, a user may use the cable pusher toeholds 214 to fully snap the front guards 210 and rear guards 212 into either a fully retracted or fully deployed position. For example, when the user fully pushes the cable pusher toeholds 214 up, the bumps on the arms of corresponding snap buttons 216 snap into the detents provided on the inner extensions of front guards 210a-210b and, therefore, hold the front guards 210 and rear guards 212 in a fully retracted state. Similarly, when the user fully pushes the cable pusher toeholds 214 down, the bumps on the arms of corresponding snap buttons 216 snap into the detents provided on the inner extensions of front guards 210a-210b and, therefore, hold the front guards 210 and rear guards 212 in a fully deployed state.

In certain embodiments, instead of using detents to hold the front guards 210 and rear guards 212 in a fully deployed or a fully retracted state, the weight and/or material of slide 320 is selected such as to ensure that the front guards 210 and rear guards 212 are held in whatever position the user places them in. For example, extension 321a may cause front guard 210a and rear guard 212a to remain in a fully retracted state, until the user compresses cable pusher toehold 214a. Similarly, in certain embodiments, extension 321a causes front guard 210a and rear guard 212a to remain in any retracted state (full or partial retraction). Note that, in certain embodiments, any state other than the fully deployed state may be considered as a retracted or a partially retracted state. Such a state may also be considered as a partially deployed state. In certain embodiments, as described above, the weight and/or material of slide 320 is selected such as to not cause enough gravity to transition front guard 210a and rear guard 212a into a partially deployed or fully deployed position without any force being applied by a user. More specifically, in certain embodiments, the weight of slide 320a does not overcome the opposite force exerted by front guard 210a and rear guard 212a (e.g., the edges of slot 317 and slot 319a, respectively). By fully compressing cable pusher 214a towards the ground again, front guard 210a and rear guard 212a transition into the deployed state, as shown in FIG. 4A.

Note that, in certain embodiments, the length of each of slot 317a or slot 319a corresponds to the amount of rotational displacement each guard (i.e., front guard 210a or rear guard 212a) experiences by going from a fully deployed to fully retracted state and vice versa. Wherever along the length of slot 317 and slot 319a extension 321a is positioned, in certain embodiments, it is configured to help maintain the corresponding state of front guard 210a and rear guard 212a. Accordingly, a user may adjust the clearance provided by front guard 210a and rear guard 212a anywhere along a spectrum, with fully deployed (e.g., least amount of clearance) at one end of the spectrum to fully retracted (e.g., most amount of clearance) at the other end of the spectrum.

Figure 5:
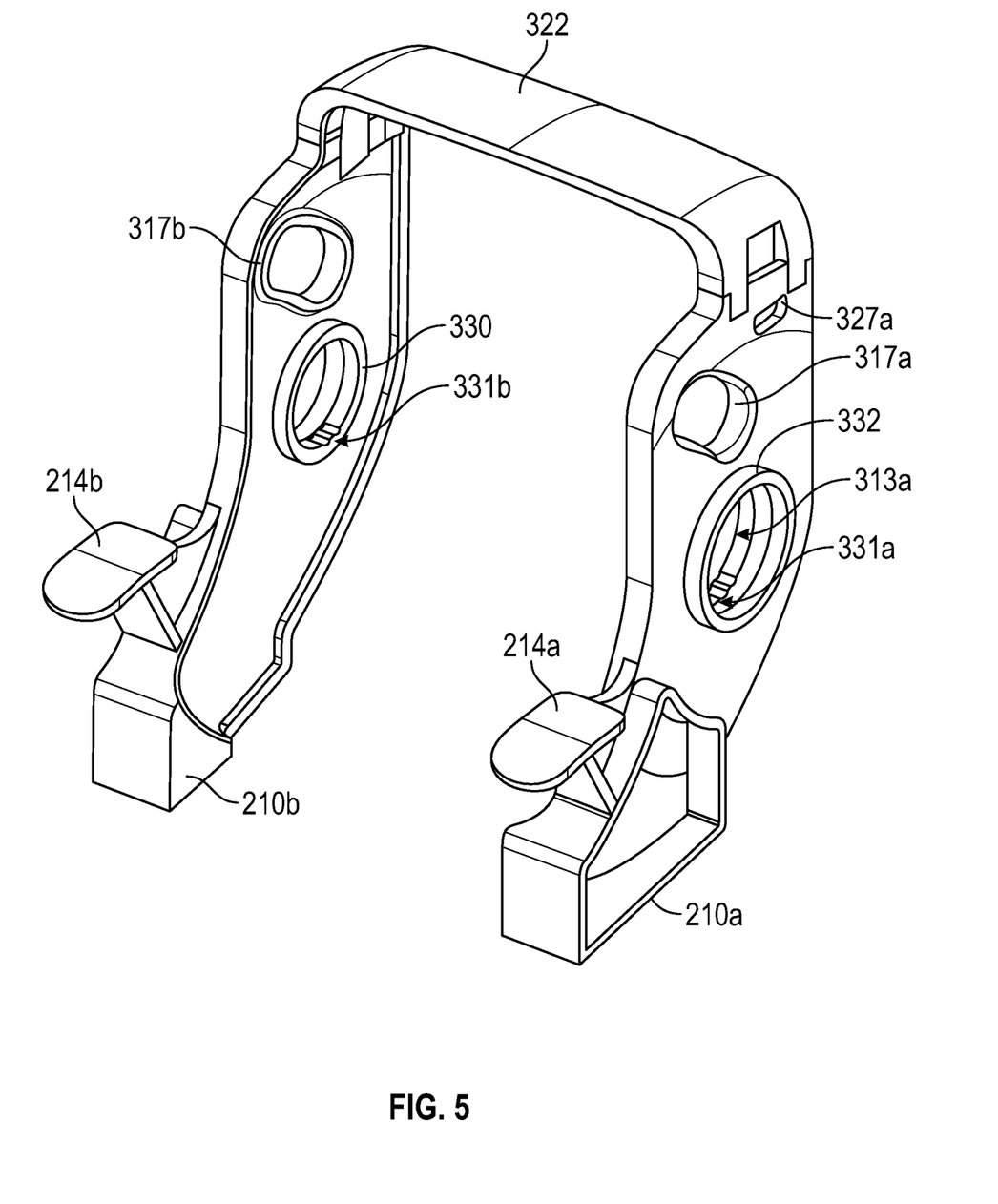
FIG. 5 illustrates a front guard and a rear guard linked together using a bridge link, in accordance with certain embodiments of the present disclosure.

FIG. 5 illustrates front guard 210a and a front guard 210b linked together using bridge link 322. As shown, opening 313a of front guard 210a comprises a circular extension or rim 332 (also referred to as "outer extension") that is configured to be inserted into opening 315 of rear guard 212a (shown in FIG. 3). An inner extension is also present on the other side of opening 313a. An example of an inner extension 330 is shown on front guard 210b. In certain embodiments, this inner extension is configured to be inserted into a circular opening provided on the outer surface of the caster wheel 101. As described above, FIG. 5 also illustrates detents 331a-331b are provided in the axis openings of the inner extensions 330 of front guards 210a-210b.

Accordingly, certain embodiments described herein provide retractable guard assemblies that can be used in conjunction with caster wheels of an equipment. The retractable guard assemblies can be deployed to push objects, such as cables and hoses, aside when the equipment is being moved around. The retractable guard assemblies can also be retracted when the equipment is moved over fixed obstacles such as doorsills and elevator sills or non-fixed but difficult-to-move obstacles such as floor mats.

The foregoing description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but are to be accorded the full scope consistent with the language of the claims.

What is claimed is:

1. A retractable guard assembly coupled to a caster of a mobile equipment, comprising:
    one or more first guards comprising corresponding one or more guard toeholds; and
    one or more second guards, wherein:
        when the one or more first guards and the one or more second guards are in a fully retracted state, fully compressing any one of the one or more guard toeholds causes the one or more first guards and the one or more second guards to transition into a fully deployed state,
        in a fully deployed state, each of the one or more first guards and the one or more second guards has a first clearance with the ground,
        when the one or more first guards and the one or more second guards are in a fully deployed state, fully lifting any one of the one or more guard toeholds causes the one or more first guards and one or more second guards to transition into the fully retracted state,
        in a fully retracted state, each of the one or more first guards and one or more second guards has a second clearance with the ground, and
        the second clearance is larger than the first clearance.
2. The retractable guard assembly of claim 1, wherein:
    the one or more guard toeholds comprise two guard toeholds,
    the one or more first guards comprise two first guards comprising the two guard toeholds,
    the one or more second guards comprise two second guards,
    two pairs of guards are placed on opposite sides of a wheel of the caster in a symmetrical manner such that the two pairs of guards directly face each other,
    each pair of guards comprises one of the two first guards and one of the two second guards,
    the two first guards directly face each other, and
    the two second guards directly face each other.
3. The retractable guard assembly of claim 2, further comprising:
    a bridge link that links the two first guards together such that moving one of the two first guards moves the other.
4. The retractable guard assembly of claim 3, further comprising:
    two slides, wherein each slide of the two slides is detachably coupled to each pair of guards of the two pairs of guards.
5. The retractable guard assembly of claim 4, wherein:
    each slide comprises an extension that is inserted into a slot of a corresponding first guard of the each pair of guards and a slot of a corresponding second guard of the each pair of guards, and
    the extension functions as an interface between each pair of guards such that the extension translates a movement in a first guard of the pair of guards to movement in a second guard of the pair of guards.
6. The retractable guard assembly of claim 5, wherein:
    when the two pairs of guards are in the fully deployed state, each extension is positioned at inner ends of corresponding slots of the each pair of guards; and
    when the two pairs of guards are in the fully retracted state, each extension is positioned at outer ends of the corresponding slots of the each pair of guards.
7. The retractable guard assembly of claim 5, wherein the extension causes each pair of guards to remain in a fully retracted or partially retracted state.
8. The retractable guard assembly of claim 5, wherein:
    the slots of each pair of guards are curved, and
    a curvature of a slot of the corresponding first guard of the each pair of guards exerts force on a corresponding extension to cause the extension to travel from inner ends of the slots to outer ends of the slots.
9. The retractable guard assembly of claim 1, wherein:
    in the fully deployed state the one or more first guards and one or more second guards are configured to push an object aside while the mobile equipment is moving, and
    in the fully retracted state the second clearance provides enough distance from the ground such as to allow the mobile equipment to move over fixed objects.
10. A caster assembly of a mobile equipment, comprising:
    a caster comprising a caster wheel;
    a retractable guard assembly coupled to the caster, the retractable guard assembly comprising:
        one or more first guards comprising corresponding one or more guard toeholds;
        one or more second guards, wherein:
            when the one or more first guards and the one or more second guards are in a fully retracted state, fully compressing any one of the one or more guard toeholds causes the one or more first guards and the one or more second guards to transition into a fully deployed state,
            in a fully deployed state, each of the one or more first guards and the one or more second guards has a first clearance with the ground,
            when the one or more first guards and the one or more second guards are in a fully deployed state, fully lifting any one of the one or more guard toeholds causes the one or more first guards and one or more second guards to transition into the fully retracted state, in a fully retracted state, each of the one or more first guards and one or more second guards has a second clearance with the ground, and the second clearance is larger than the first clearance.

11. The caster assembly of claim 10, wherein:

the one or more guard toeholds comprise two guard toeholds, the one or more first guards comprise two first guards comprising the two guard toeholds, the one or more second guards comprise two second guards, two pairs of guards are placed on opposite sides of a wheel of the caster in a symmetrical manner such that the two pairs of guards directly face each other, each pair of guards comprises one of the two first guards and one of the two second guards, the two first guards directly face each other, the two second guards directly face each other, and the caster assembly further comprises a bridge link that links the two first guards together such that moving one of the two first guards moves the other.

12. The caster assembly of claim 11, further comprising:

two slides, wherein each slide of the two slides is detachably coupled to each pair of guards of the two pairs of guards, wherein each slide comprises an extension that is inserted into a slot of a corresponding first guard of each pair of guards and a slot of a corresponding second guard of each pair of guards, and the extension functions as an interface between each pair of guards such that the extension translates a movement in a first guard of the pair of guards to movement in a second guard of the pair of guards.

13. The caster assembly of claim 12, wherein:

when the two pairs of guards are in the fully deployed state, each extension is positioned at inner ends of corresponding slots of the each pair of guards;

when the two pairs of guards are in the fully retracted state, each extension is positioned at outer ends of the corresponding slots of the each pair of guards.

14. The retractable guard assembly of claim 12, the extension causes each pair of guards to remain in a fully retracted or partially retracted state.

15. The retractable guard assembly of claim 12, wherein:

the slots of each pair of guards are curved, and a curvature of a slot of the first guard of each pair of guards exerts force on a corresponding extension to cause the extension to travel from inner ends of the slots to outer ends of the slots.

* * * * *